United States Patent [19]

Westover et al.

[11] Patent Number: 4,580,856
[45] Date of Patent: Apr. 8, 1986

[54] COMPOSITE CLAMPING SHELL FOR ELECTRIC CIGAR LIGHTERS

[75] Inventors: Brooke N. Westover, Stratford; John J. Comerford, Stamford; Donald J. Mattis, Norwalk, all of Conn.

[73] Assignee: Casco Products Corporation, Bridgeport, Conn.

[21] Appl. No.: 487,562

[22] Filed: Apr. 22, 1983

[51] Int. Cl.$^4$ .............................................. B60D 1/08
[52] U.S. Cl. ...................................... 339/10; 339/142; 339/276 SF; 29/511
[58] Field of Search ................................ 339/136–142, 339/144, 145, 276 SF, 10, 182–183, 83, 84, 86; 29/511; 219/260–268

[56] References Cited

U.S. PATENT DOCUMENTS

| | | | |
|---|---|---|---|
| 1,082,397 | 12/1913 | Blass | 339/84 |
| 1,135,193 | 4/1915 | Klein | 339/139 R |
| 1,150,434 | 8/1915 | Klein | 339/140 R |
| 1,887,785 | 11/1932 | Prop | 339/84 |
| 2,236,483 | 3/1941 | Bahr | 219/267 |
| 2,425,679 | 8/1942 | Jackson | 339/142 |
| 2,736,872 | 2/1956 | Heath et al. | 339/142 |
| 2,905,922 | 9/1959 | Touchel | 339/141 |
| 3,915,543 | 10/1975 | Pfeifer | 339/276 SF |
| 3,919,521 | 11/1975 | Iwao | 219/262 |
| 3,955,333 | 5/1976 | Fellin | 219/267 |
| 4,056,876 | 11/1977 | Lammerman | 329/511 |
| 4,459,464 | 7/1984 | Oda et al. | 219/264 |

FOREIGN PATENT DOCUMENTS

690767 4/1953 United Kingdom ........... 339/136 M

*Primary Examiner*—Gil Weidenfeld
*Assistant Examiner*—David L. Pirlot
*Attorney, Agent, or Firm*—Cynthia Berlow; Mitchell D. Bittman

[57] ABSTRACT

A composite clamping shell for securing the socket of an electric cigar lighter to a panel of an automobile, has a rolled sheet-metal body of tubular shape, with open ends and a clinched seam. Attached to the body is a drawn, sheet metal sleeve having a rolled screw thread. The body has inwardly displaced stop shoulders to position the sleeve, which latter has an annular out-turned flange abutting the stop shoulders. Edge portions of the body end are laid over the out-turned flange of the sleeve to hold it captive and prevent relative movement. The body is stamped out of a piece of flat sheet metal stock and thereafter rolled into the desired cylindrical shape. The sleeve is produced by drawing operations, from flat stock. Reduced manufacturing cost is thus realized.

32 Claims, 17 Drawing Figures

COMPOSITE CLAMPING SHELL FOR ELECTRIC CIGAR LIGHTERS

BACKGROUND OF THE INVENTION

This invention relates generally to electric cigar lighters of the type employed in automobiles or other motor vehicles, and more particularly to lighters of the type incorporating a socket part that is mounted in a dashboard or other panel, and a removable plug part that carries an electric heating element.

Many different constructions involving electric cigar lighters of the above type have been developed over the years. Generally, the socket of the lighter device had an out-turned flange or bezel at its front, and was inserted through a hole in the dashboard or panel, being held captive therein by a tubular clamping shell that was screwed onto the socket from the rear, behind the dashboard. The front edge of the clamping shell engaged the rear surface of the dash, and held the socket in position. That is, the dashboard or panel was sandwiched between the out-turned flange of the socket and the front edge of the clamping shell.

Most of the older model automobiles employed metal panels, and thus one part of the cigar lighter circuit was established from the metal part of the socket to the panel and ground. With the advent of newer car models involving both cost and weight reduction, plastic panels and bezels are now being employed to a far greater extent. This generally necessitates the use of a grounding terminal or lug of some type, in electrical contact with the metal shell or body part of the socket. Previously, the electrical contact to this part was made by means of a spade lug that was welded to the clamping shell, and which was received in a cooperable grounding terminal from the vehicle electrical system. Since the clamping shell, being constituted of metal, was in electrical contact with the socket, there existed the required continuity for the ground circuit.

Several problems have occured, however, with regard to the welding of a lug onto the clamping shell, the most important including lack of a reliable test for integrity of the weld, and failure of the weld at some time during the subsequent life of the component or shell. Generally both the socket and shell are plated in order to avoid deterioration from moisture, particularly where the devices are disposed in the arm rests of the doors of the vehicle. Often these devices would become wet if a window of the vehicle was inadvertently left open during a storm, or where the vehicle was exposed to a corrosive industrial or salt atmosphere. In the past, when it was required to fasten an electrical connector in the form of a spade lug to the clamping shell, it has been customary to plate the part after the fastening operation, since the welding disturbed any pre-existing plating. But, under any circumstance, the welding step was time consuming, involving manual labor, and this, as well as the plating of finished parts, represented an additional expense. With the impact of the continually rising labor costs represented by the above, the clamping shell started to become a product that was cost-prohibitive and no longer economical to produce in the environment of the electrical cigar lighter.

SUMMARY OF THE INVENTION

The above disadvantages and drawbacks of prior clamping shells for automobile cigar lighters are obviated by the present invention, which has for one object the provision of a novel and improved composite, clamping shell which is especially rugged and durable in its construction while at the sime time being extremely economical to manufacture and mass produce.

A related object of the invention is to provide an improved clamping shell as above set forth, which is especially simple and also lends itself to economical, mass-production techniques and equipment, thereby reducing the overall cost of the shell significantly.

Still another object of the invention is to provide an improved clamping shell as above characterized, wherein an integral electrical connector is incorporated on one of the parts at the time that the part is formed from a substantially flat piece of sheet metal stock, thereby eliminating welding or other costly attachment operations of the kind that were previously required with connectors, as constituting a necessary part of the device.

Yet another object of the invention is to provide an improved clamping shell of the kind indicated, which is highly resistant to malfunctioning, being rugged and reliable to the extent that it is strong enough to resist damage during all normal handling, installation and servicing procedures.

A still further object of the invention is to provide an improved clamping shell as outlined above, wherein manual assembly operations during its fabrication are reduced to an absolute minimum, thereby eliminating operator related error and other problems arising from poor judgement on the part of personnel.

A further object of the invention is to provide an improved composite clamping shell as characterized, which can be readily fabricated with automated machinery, and wherein the component parts thereof can be from flat stock which optionally can be pre-plated, thus simplifying the overall manufacturing procedure and reducing overall costs and improving quality.

Yet another object of the invention is to provide a novel method for producing a composite clamping shell from substantially flat stock, which method is both straightforward and economical to carry out, and results in a product that requires a minimum number of separate assembly steps.

A still further object of the invention is to provide a method as above characterized, which enables an integral grounding lug to be incorporated in the clamping shell, thereby eliminating the need for any welding operations. The above objects are accomplished by a unique composite clamping shell for electric cigar lighters, comprising essentially a rolled sheet-metal body of tubular configuration, having open ends and a reverse-bend clinched seam extending longitudinally between its ends, and in addition a drawn, sheet metal sleeve of annular configuration, having a rolled screw thread in its wall. The rolled, sheet metal body has multiple internal punched stop shoulders that are spaced circumferentially apart, and are also spaced inwardly from one end of the body. One end of the rolled thread sleeve has an annular, out-turned flange which is received in the punched end of the body, in abutment with the stop shoulders. The edge portions of the punched end of the body are laid over the flange of the threaded sleeve so as to retain it on the body, and prevent relative movement between the two parts. The parts can be formed from commercial grade stock which is optionally mass pre-plated or coated, thereby reducing the overall manufacturing cost by eliminating special materials or time-consuming welding procedures on the assembled pieces or parts.

The objects of the invention are further accomplished by the provision of a composite clamping shell for electric cigar lighters, comprising a sheet-metal body of tubular configuration, having an open end adapted to engage the rear surface of an apertured panel in an automobile, adjacent the intended location of the mounting flange for the cigar lighter socket. Attached to the body is a drawn sheet metal sleeve of annular configuration, having a rolled screw thread and cooperable means for joining it to the sheet-metal body, and for preventing relative movement between the two parts whereby the sleeve threads can pull up tightly on cooperable threads of the socket and secure the latter in the panel aperture. The body further has an electrically conductive terminal in the form of an integral spade lug which is at substantially the same electrical potential as the body at all times. The spade lug is adapted for connection to a cooperable electrical connector of the electrical system of an automobile, for carrying electrical current from the cigar lighter socket. By virtue of the elimination of welds between the clamping shell and the electrical terminal or spade lug, a time-consuming step in the assembly process is completely eliminated and in addition increased ruggedness and reliability are had.

The objects of the invention are further accomplished by a novel method for producing a composite clamping shell for an electric cigar lighter, comprising the steps of stamping out a flat substantially rectangular blank from commercial grade stock, laterally displacing multiple stop-shoulders along and spaced inwardly from one end of the blank, rolling the blank into a cylindrical shape and forming the adjoining edges into an interlocking, tightly crimped seam to secure the edges together, deep-drawing a sheet metal shell of annular configuration, and having an out-turned annular flange at one end, rolling a thread in walls of the shell, placing the flange of the shell into one end of the cylindrically-shaped blank against the stop shoulders thereof, and laying over onto the flange, edge portions of the one end of the cylindrically-shaped blank to secure the threaded shell thereto.

Other features and advantages will hereinafter appear.

In the drawings, illustrating a preferred embodiment of the invention.

Figures 1, 2, 3, 4, 5, 6:
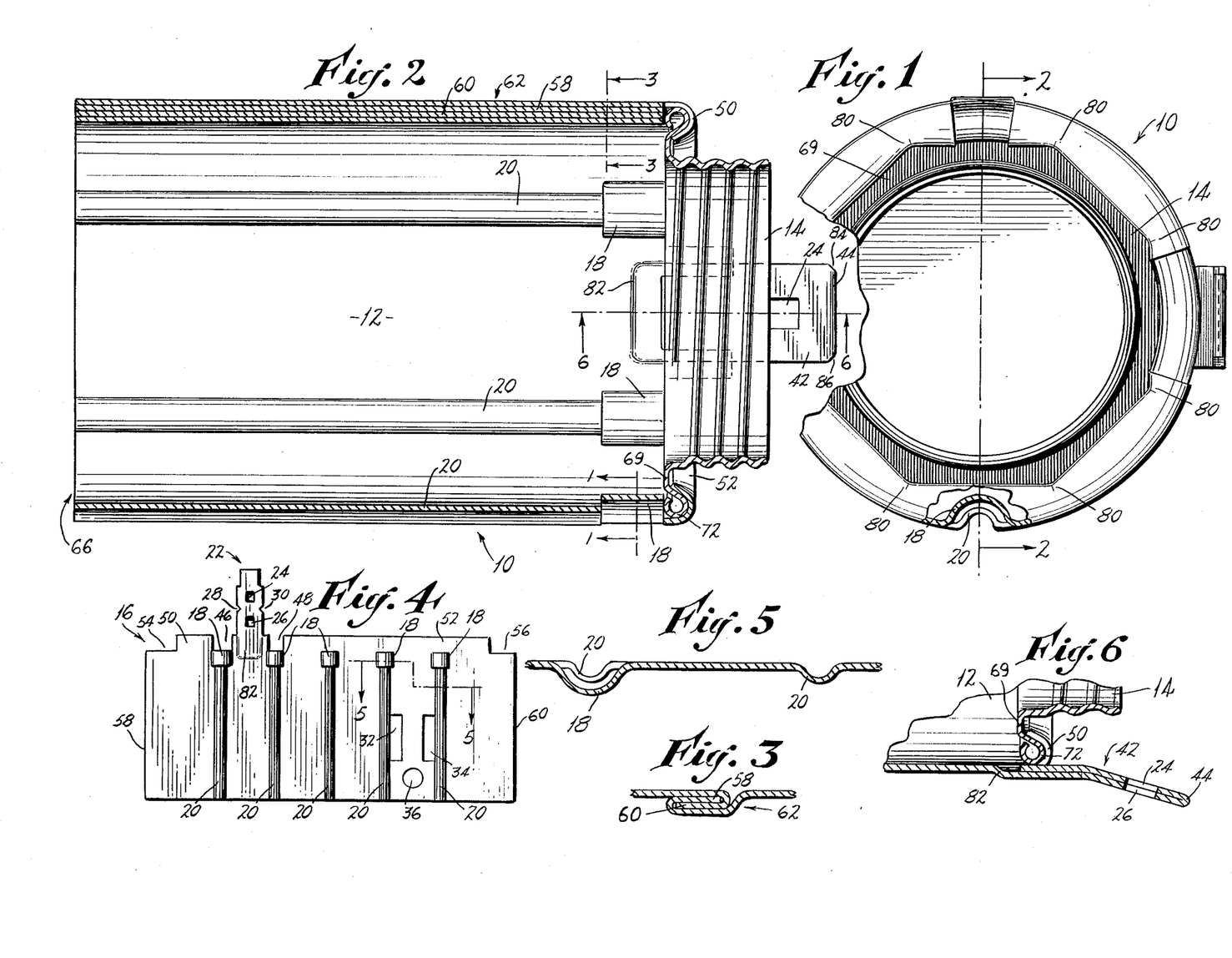
FIG. 1 is a view, partly in end elevation and partly in section, illustrating the improved composite clamping shell of the present invention.
FIG. 2 is a section taken in the line 2—2 of FIG. 1.
FIG. 3 is a fragmentary section taken on the line 3—3 of FIG. 2.
FIG. 4 is a plan view of a blank or stamping employed to fabricate the body of the shell, shown prior to its formation into a cylindrical shape, and having various structural features imparted thereto, this view being similar to that of FIG. 10, which shows the stamping prior to such processing.
FIG. 5 is a fragmentary section taken on the line 5—5 of FIG. 4.
FIG. 6 is a fragmentary section taken on the line 6—6 of FIG. 2.
Figures 7, 8:
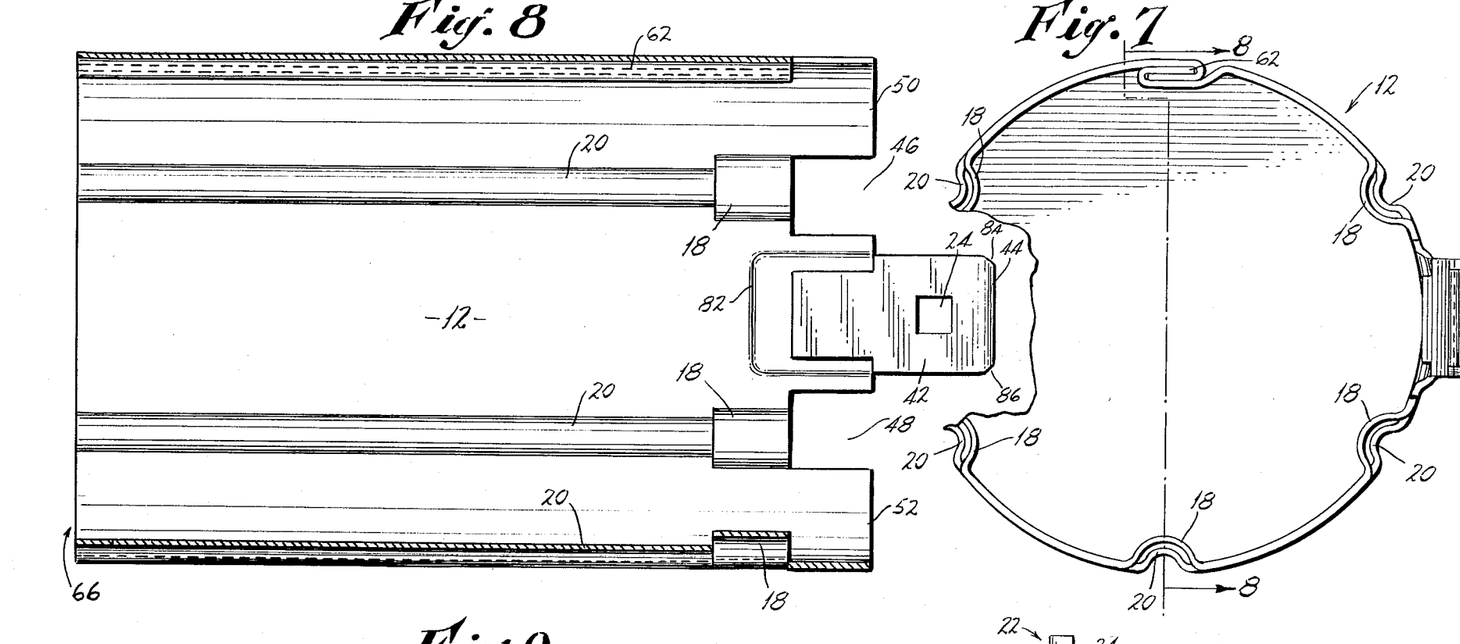
FIG. 7 is a right end elevation of the tubular body of the composite shell, showing various details of the construction.
FIG. 8 is a section taken on the line 8—8 of FIG. 7.
Figures 11, 12, 13, 14, 15, 16, 17:
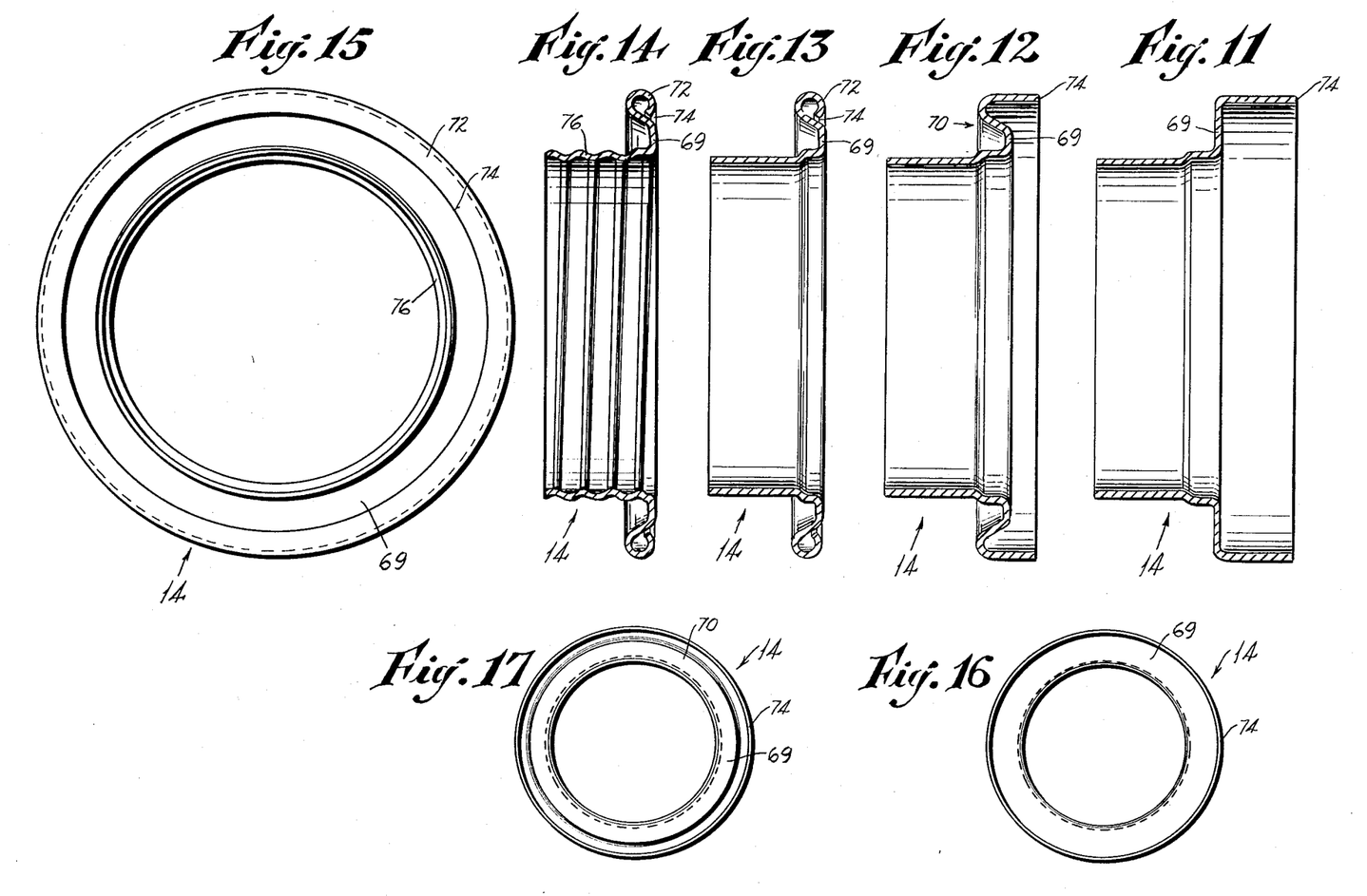
FIG. 11 is a vertical section of the sleeve portion of the composite clamping shell, during a first step in its formation wherein it is drawn into the configuration illustrated from a substantially flat blank of material (not shown).
FIG. 12 is a view like that of FIG. 11, but illustrating a further step in the formation of the sleeve.
FIG. 13 is a view like that of FIG. 11, but illustrating a still further step in the formation of the sleeve.
FIG. 14 is a view like that of FIG. 11, but showing the final step in the formation of the sleeve, wherein a portion thereof has had imparted to it a rolled thread formation.
FIG. 15 is a right end elevational view of the sleeve of FIG. 14.
FIG. 16 is a right end elevation of the sleeve as it appears in FIG. 11, but on a reduced scale.
FIG. 17 is a right end elevation of the sleeve as it appears in FIG. 12, also on a reduced scale.

Referring to FIGS. 1 and 2 and in accordance with the present invention, there is illustrated the improved cigar lighter clamping shell designated generally by the numeral 10, which in the present instance is constituted as two separate parts, a tubular body 12 shown in FIG. 8 and a sleeve 14 illustrated in FIG. 14.

Figure 10:
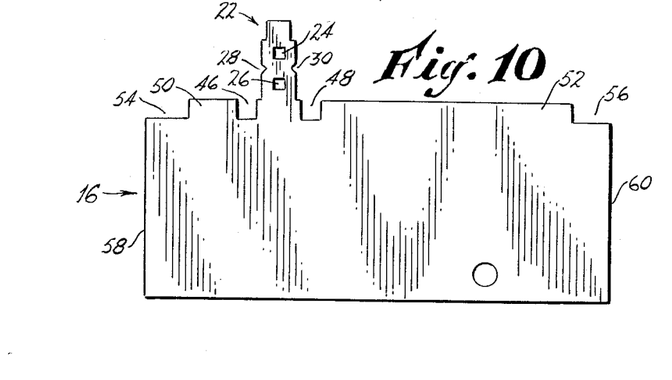
FIG. 10 is a plan view showing the body of the shell just after stamping or blanking from a piece of substantially flat sheet-metal material (not shown).

By the present invention, the tubular body 12 is initially stamped from a blank of flat, sheet-metal stock which can optionally be pre-plated or pre-coated on both sides, the stamping having the form illustrated in FIG. 10 and designated by the numeral 16. Following the initial stamping operation, there is imparted to the stamping 16 a series of laterally extending projections 18, which can take the form of five inwardly lanced lugs, constituting positioning or stop shoulders. In addition, there is formed in the stamping 16 a series of longitudinal strengthening or stiffening ribs 20, shown here as being five in number, which minimize any tendency for the stamping to deform as it is being further processed.

Also by the present invention, there is formed on the stamping a projecting lug 22 having two generally square or rectangular apertures 24, 26 and a pair of notches 28, 30 located on opposite sides of the lug 22, which facilitate bending of the lug back upon itself, as will be explained below. Apertures 32, 34 are also provided in the stamping 16, being rectangular as shown and adapted to receive mountings of a housing (not shown) for a lamp which is intended to provide illumination to the socket of the cigar lighter. Such lighting is desirable for replacement of the cigar lighter plug following its use, under dark conditions. The circular hole 36 is intended to be aligned with the filament of an incandescent bulb (not shown), to provide the desired illumination. Since the housing and bulb per se form no part of the present invention, they have been omitted from the drawings in the interest of simplicity and clarity. Such housings that are associated with the clamping shell, and used for illumination of the socket of a cigar lighter device are old and well known in the art.

As can now be understood, the stamping operation which produces the blank 16 of FIG. 4 can also provide the structural features or embossings illustrated in FIG. 4 all at the same time, that is, simultaneously with one another, depending on the nature of the dies that are available or are being employed.

Figure 9:
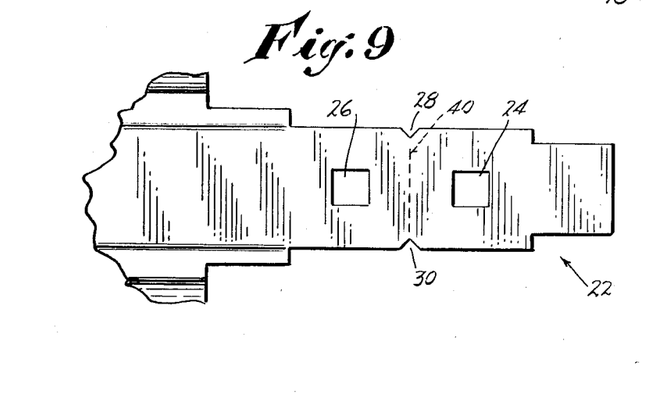
FIG. 9 is a fragmentary view of a projection that is formed integrally with the blank of FIG. 4, this projection being adapted for folding back upon itself to form a spade lug.

FIG. 9 illustrates an enlarged view of the projection 22, showing the holes 24, 26 and the notches 28, 30.

Following completion of the stamping operation, the stamped part will appear as in FIG. 4. By the present invention, the projection 22 is folded back upon itself along the dotted line 40 shown in FIG. 9, such that the outer end of the projection rests on the side of the stamping having the stops 18, with the holes 24, 26 in register with one another. This step accomplishes several objectives. The projection 22 is formed into a double thickness of material, that is, it consists of two layers of superposed metal, providing increased strength and rigidity which has been found to be important, as will be pointed out later. Second, with the holes 24, 26 overlying one another, they provide a single recess which is adapted to receive a bead (not shown) on a cooperable electrical connector extending from the electrical system of the vehicle with which the cigar lighter is to be used. As illustrated in FIG. 6, the projection 22, when folded back in this manner, constitutes a spade lug 42 having a folded leading edge 44 which also facilitates installation of the cooperable electrical connector.

Referring again to FIG. 4, by the present invention the stamping has two additional cut-outs 46, 48 which are disposed on opposite sides of the projection 22 and which provide clearance for edge portions 50, 52 of the stamping 16 when the composite clamping shell 10 is assembled, as will be explained below. Also, additional cut-outs 54, 56 are provided to enable the stamping in FIG. 4 to be readily formed into the necessary, substantially cylindrical or tubular shape as illustrated in FIG. 8, with the longitudinal edges 58, 60 being joined to one another by means of a clinched seam 62 particularly illustrated in FIG. 3, and also shown in FIG. 2, extending for substantially the entire length of the tubular shaped structure 12 (hereinafter also referred to as a rolled sheet-metal body of tubular configuration). The end of the seam 62 extends radially inward of the cylindrical surface formed by the body 12 and is substantially aligned with the corresponding ends of the projections 18, thus constituting a sixth positioning or stop shoulder for the sleeve 14 as will be explained below. In FIG. 8, the left end of the body is seen to be open at 66, and adapted to engage the rear surface of a dashboard or panel in which the cigar lighter device is to be installed.

Referring now to FIGS. 11–17 there is illustrated the other part of the composite clamping shell of the present invention, this other part being in the form of a drawn, sheet metal sleeve of annular configuration. FIGS. 11–14 show various steps in the formation of the sleeve 14. The cup of FIG. 11 is drawn from a substantially flat blank of sheet metal. In FIG. 12, there has been imparted to the out-turned flange 69 of the component 14 a reverse bend 70, after which the outer periphery is curled over at 72 in such a manner as to conceal the sharp edge 74. Following this step, the part 14 is placed in a machine (not shown) which rolls a thread formation into one end, as at 76. The threads 76 have the same pitch as and are adapted to mate with cooperable threads on the end of the cigar lighter socket (not shown) with which the clamping shell is to be employed. The bend 70 and curl 72 are part of the out-turned flange 69 on the sleeve 14. FIGS. 15–17 show various views of the sleeve 14 during its formation.

Referring now to FIGS. 2, 8 and 14, the assembly of the sleeve 14 to the tubular body 12 can be readily understood. The sleeve 14 is positioned with its out-turned flange 69 facing the body 12, and the flange is inserted in the open right end of the body (FIG. 8) until the flange 69 engages the stop shoulders 18, and also the end of the clinched seam 62 which likewise acts as a stop. The edge portions 50, 52 of the end of the body are then curled over the flange 69 of the sleeve, resulting in the structure of FIG. 2 being evolved. As pointed out previously, clearance notches 46, 48 are provided to enable the curling operation to be carried out without encountering interference with the spade lug 42. As illustrated in FIG. 6, the edge 50 of the body that is curled over is shown in elevation. Following the curling or laying over of the edge portions 50, 52, the sleeve 14 is held captive in the body. In order to insure that there is no relative movement between the sleeve 14 and the body 12, a series of dimpled formations are imparted to the rolled over edge portions 50, 52, such dimpled formations being eight in number and designated by the numeral 80. The dimpling operation can be readily performed with a suitable octagonal shaped punch, which deforms the rolled over edge portions, as well as the curl 72 of the sleeve, thereby insuring tight engagement between the two parts and minimizing the possibility of relative movement therebetween; such movement would be undesirable since during assembly of the clamping shell to the cigar lighter socket, a certain amount of torque is applied to the threaded portion 76, while the body 12 is being held stationary (also by its engagement with the rear surface of the dashboard, bezel, etc.).

Further, in accordance with the invention, the inner layer of the spade lug 42 is sandwiched between the outer layer of the latter and the curl 72 of the sleeve 14, as particularly illustrated in FIG. 6. Such a construction has been found to provide additional stiffness and strength to the spade lug 42, minimizing the possibility of deformation thereof during handling or use. As shown in FIG. 6, the inner layer of the spade lug 42 lies generally in the same cylindrical surface as the remainder of the body 12, whereas the outer layer of the lug lies outside the confines of the body. The lug 42 may optionally be bent at a slight angle in a radially outward direction as shown in FIG. 6, to facilitate installation of the electrical connector that mates with it. The present construction also gives rise to a small shoulder 82 having reverse bends at the juncture of the lug 42 and remainder of the body 12. The shoulder 82 forms a recess into which the inner lamination or layer of the spade lug can nest while still being sandwiched between the surface of the recess and the curl 72. This recess can be imparted to the body at the same time that the latter is stamped in its flat condition as in FIG. 4.

Also by the present invention, the folded edge 44 of the spade lug 42 has bevelled corners, shown in FIG. 2 and designated 84 and 86, this again facilitating installation of the cooperable electrical connector. These corners are automatically imparted to the lug when it is folded back upon itself, by virtue of the notches 28, 30 illustrated in FIGS. 4 and 9. In addition, by providing notches in the projection 22 of FIG. 4, a line of weakness corresponding to the dotted outline 40 of FIG. 9 is established, thereby facilitating the subsequent bending operation.

The above construction has a number of distinct advantages which are not found in the prior art devices. First, both of the component parts of the shell can be easily and quickly fabricated from substantially completely flat sheet-metal stock.

Second, no welding operations are required during the fabrication. There are thus eliminated any problems resulting from failure of the weld, or weld-testing procedures. This constitutes a distinct advantage, especially when one considers that it has been customary in the past to weld spade lugs onto the clamping shells of cigar lighter devices in order to complete the ground side of the circuit. The provision of the integrally formed spade lug 42 not only eliminates the necessity for welding and its consequent cost, but it also provides the required reliable electrical continuity in an extremely simple manner. The particular desired configuration for the spade lug can be determined at the time that the blank is stamped out, and modifications made if needed, at the time of stamping in order to suit different conditions of use. The unique arrangement whereby the laid-over edge portions of the tubular body are dimpled and deformed so as to improve the retention of the sleeve has been found to be a simple yet extremely effective means for insuring good mechanical and electrical connection between the body and sleeve. Problems with loosening of the sleeve are virtually completely eliminated. The cut-outs 54, 56 insure that no interference is encountered when the longitudinal clinched seam 62 is formed in the body. Similarly, the cut-outs 46, 48 reduce any likelihood of interference with the formation and subsequent utilization of the spade lug 42.

The present invention also embraces a novel method of making a composite, clamping shell for an electric cigar lighter, comprising essentially the steps of blanking out a flat, substantially rectangular blank 16 from commercial grade stock, laterally displacing multiple stop-shoulders 18 along and spaced inwardly from one end of the blank 16, rolling the blank 16 into a cylindrical shape 12 and forming the adjoining edges 58, 60 into an interlocking, tightly crimped seam 62, FIG. 3, so as to secure the edges together, deep-drawing a sheet-metal shell 14 of annular configuration and having an out-turned annular flange 69 at one end, rolling a thread 76 in the walls of the shell 14, placing the flange 69 of the shell into one end of the cylindrically shaped blank 12 against the stop-shoulder portions 18 thereof, and laying over onto the flange 69 the edge portions 50, 52 of the end of the blank 12 to secure the threaded shell 14 thereto.

The method further comprises the steps of dimpling, as at 80, the laid over edge portions 50, 52 of the cylindrically-shaped blank 12 so as to deform them and bring them into tighter engagement with the flange 69 of the sleeve 14.

The methods of the invention further include steps involved with providing stop-shoulders 18 on the blank 16, either during the stamping of the same or at another time, imparting a series of longitudinal stiffening ribs 20 to the blank 16, forming the apertures 32, 34 and 36 for a lamp housing and lamp, forming the cut-outs 46, 48 and 54, 56 to provide for the necessary clearance spaces during subsequent steps in the assembly of the composite shell, and finally the formation of the projection 22 which is adapted to be folded back upon itself so as to constitute the spade lug 42. This forming of the projection 22 includes punching out the holes 24, 26 and the notches 28, 30 which establish a line of weakness such that the projection 22 can be folded back upon itself along this line, to form the said lug.

From the above it can be seen that we have provided a novel and improved clamping shell for an electric cigar lighter and method for its production, the device being especially simple in its structure and economical to manufacture and mass produce, by virtue of the complete elimination of welding operations. In spite of its simplicity, it is especially rugged in use, and not likely to become deformed during normal handling, installation or use.

The device is thus seen to represent a distinct advance and improvement in the technology of electric cigar lighters for automotive vehicles.

Each and every one of the appended claims defines an aspect of the invention which is distinct from all others, and accordingly each claim is to be treated in this manner when examined in light of the prior art in any determination of novelty or validity.

Variations and modifications are possible without departing from the spirit of the claims.

What is claimed is:

1. A composite clamping shell for electric cigar lighters, comprising in combination:
   (a) a rolled sheet-metal body of tubular configuration, having open ends and a reverse-bend clinched seam extending longitudinally between its ends,
   (b) said body having a plurality of distinct, integral inwardly-displaced stop shoulders adjacent one end, said shoulders being separate and distinct, and being spaced circumferentially apart from one another,
   (c) said stop shoulders being spaced inwardly from the edge of said one end,
   (d) a drawn, sheet metal sleeve of annular configuration, having a rolled screw thread in its wall, all parts of said sleeve being integral with one another, said sleeve being separate and distinct from said body,
   (e) one end of said sleeve having an annular, out-turned flange which is telescopically received inside the said one end of the sheet-metal body in abutment with said stop shoulders,
   (f) the edge portions of said one end of the sheet-metal body being radially inwardly laid over the flange of said threaded sleeve to tightly retain the latter on the body and permanently restrain the two parts against relative rotation.

2. The invention as defined in claim 1, and further including:
   (a) a spade lug integral with said sheet-metal body,
   (b) said spade lug comprising a double thickness of sheet metal, providing two layers of superposed material,
   (c) the inner layer being sandwiched between the outer layer and the said annular out-turned flange of the drawn, sheet-metal sleeve and being in intimate engagement therewith, to provide added stiffness to said lug.

3. The invention as defined in claim 1, wherein:
   (a) said rolled sheet-metal body has a series of apertures adapted to receive and retain a housing for carrying an electric light adapted to facilitate re-insertion of the plug into the socket.

4. The invention as defined in claim 1, wherein:

(a) said stop shoulders are lanced from the body.
5. The invention as defined in claim 1, wherein:
(a) substantially all parts of said clinched seam lie within the cylindrical surface formed by the rolled sheet-metal body, so as to present a smooth exterior.
6. The invention as defined in claim 1, wherein:
(a) said body and sleeve are formed of sheet metal stock, preplated on both sides.
7. The invention as defined in claim 1, wherein:
(a) the laid over edge portions of the said one end of the sheet-metal body are dimpled in at least one location, so as to more tightly engage the said outturned flange of the drawn, sheet-metal sleeve, and thereby further inhibiting any tendency for there to occur relative rotation between said body and said sleeve.
8. The invention as defined in claim 1, wherein:
(a) all portions of said rolled sheet-metal body are integral with one another.
9. The invention as defined in claim 1, and further including:
(a) an electrical connector comprising a spade lug integrally formed with the rolled sheet metal body, for connection with a mating electrical connector of an automobile electrical system.
10. The invention as defined in claim 9, wherein:
(a) said spade lug is preplated on both sides.
11. The invention as defined in claim 9, wherein:
(a) said spade lug comprises two layers of sheet metal, said lug being formed by folding back upon itself a projection on the body so as to present a folded edge at the extremity of the said lug.
12. The invention as defined in claim 11, wherein:
(a) said folded edge has beveled corners to facilitate connection with said mating electrical connector.
13. The invention as defined in claim 11, wherein:
(a) said spade lug has a central aperture for receiving a cooperable spring detent on the said mating electrical connector, such that the latter can interlock with the lug.
14. The invention as defined in claim 11, wherein:
(a) said spade lug has beveled corners, and a central aperture,
(b) said sheet-metal body being formed by stamping out a substantially flat blank of material,
(c) the configuration for said beveled corners and central aperture being formed at the same time that said stamping occurs.
15. The invention as defined in claim 1, wherein:
(a) said stop shoulders comprise inwardly lanced protruding lugs, struck from the walls of the tubular sheet-metal body.
16. The invention as defined in claim 15, wherein:
(a) said sheet-metal body is formed by stamping out a substantially flat blank of material,
(b) said lugs being formed in the flat blank, prior to its being rolled into said tubular configuration.
17. The invention as defined in claim 15, wherein:
(a) said lugs are five in number.
18. The invention as defined in claim 8, wherein:
(a) said sheet-metal body is rolled from a substantially flat blank of sheet metal stock having embossed formations.
19. The invention as defined in claim 18, wherein:
(a) said rolled sheet-metal body has a plurality of longitudinal stiffening ribs circumferentially spaced about its periphery, (b) said stiffening ribs being formed at the time that the rolled body is in a substantially flat condition.
20. The invention as defined in claim 11, wherein:
(a) the inner layer of said spade lug is disposed inwardly toward the axis of the body, such that it can engage the outturned flange of the sleeve,
(b) said engagement providing support to the inner layer of the lug, and minimizing the tendency for the lug to become inadvertently bent.
21. The invention as defined in claim 20, wherein:
(a) the said inner layer of the lug lies generally within the same cylindrical surface as the rolled body.
22. The invention as defined in claim 20, wherein:
(a) the outer layer of said lug is joined to the remainder of the body at a location defined by a shoulder having reverse bends, said outer layer being disposed outside of the cylindrical surface of the said body.
23. A composite clamping shell for electric cigar lighters, comprising in combination:
(a) a rolled sheet-metal body of tubular configuration, having an open end engaging the rear surface of an apertured panel in an automobile, adjacent the location of a mounting flange for a threaded cigar lighter socket,
(b) a sheet metal sleeve of annular configuration, having a screw thread in its wall, said sheet metal sleeve being separate and distinct from the rolled sheet metal body, and
(c) cooperable means joining said sheet sleeve to the other end of the sheet-metal body, and for permanently restraining the two parts against relative rotation such that the sleeve thread can mate with the cooperable thread on the cigar lighter socket and thereby hold the latter captive in the aperture of said panel, and
(d) an electrically conductive spade lug formed integral with the sheet-metal body so as to be at substantially the same electrical potential thereof at all times, said spade lug being adapted for connection to a cooperable electrical connector of the electrical system of an automobile for carrying electrical current between said electrical system and said cigar lighter socket.
24. A composite clamping shell for electric cigar lighters, comprising in combination:
(a) a rolled sheet-metal body of tubular configuration, having open ends and a reverse-bend clinched seam extending longitudinally between its ends,
(b) said body having a plurality of inwardly-displaced stop shoulders adjacent one end and spaced circumferentially apart,
(c) said stop shoulders being spaced inwardly from the edge of said one end,
(d) a drawn, sheet metal sleeve of annular configuration, having a rolled screw thread in its wall,
(e) one end of said sleeve having an annular, outturned flange which is received in the said one end of the sheet-metal body in abutment with said stop shoulders,
(f) the edge portions of said one end of the sheet-metal body being laid over the flange of said threaded sleeve to retain the latter on the body,
(g) the laid-over edge portions of the said one end of the sheet-metal body being dimpled at a number of circumferentially spaced locations, so as to more tightly engage the said out-turned flange of the drawn, sheet-metal sleeve, thereby preventing relative rotation between said body and said sleeve.

25. The invention as defined in claim 24, wherein:
(a) said dimpled locations are eight in number, and are substantially equally spaced circumferentially about the periphery of the said edge portions.

26. A composite clamping shell for electric cigar lighters, comprising in combination:
(a) a rolled sheet-metal body of tubular configuration, having open ends and a reverse-bend clinched seam extending longitudinally between its ends,
(b) said body having a plurality of inwardly-displaced stop shoulders adjacent one end and spaced circumferentially apart,
(c) said stop shoulders being spaced inwardly from the edge of said one end,
(d) a drawn, sheet metal sleeve of annular configuration, having a rolled screw thread in its wall,
(e) one end of said sleeve having an annular, out-turned flange which is received in the said one end of the sheet-metal body in abutment with said stop shoulders,
(f) the edge portions of said one end of the sheet-metal body being laid over the flange of said threaded sleeve to retain the latter on the body, and
(g) an electrical connector comprising a spade lug integrally formed with the remainder of said rolled sheet-metal body, for connection with a mating electrical connector of an automobile electrical system,
(h) the edge portions of the one end of said sheet-metal body having cut-outs on opposite sides of said spade lug, to provide clearance therefor when the edge portions are laid over the flange of the threaded sleeve.

27. A composite clamping shell for electric cigar lighters, comprising in combination:
(a) a rolled sheet-metal body of tubular configuration, having open ends and a reverse-bend clinched seam extending longitudinally between its ends,
(b) said body having a plurality of inwardly-displaced stop shoulders adjacent one end and spaced circumferentially apart,
(c) said stop shoulders being spaced inwardly from the edge of said one end,
(d) a drawn, sheet metal sleeve of annular configuration, having a rolled screw thread in its wall,
(e) one end of said sleeve having an annular, out-turned flange which is received in the said one end of the sheet-metal body in abutment with said stop shoulders,
(f) the edge portions of said one end of the sheet-metal body being laid over the flange of said threaded sleeve to retain the latter on the body,
(g) the edge portions of said one end of the sheet-metal body having relieved areas adjacent the location of said seam, so as to not interfere with the laying over of the same on the flange of the threaded sleeve.

28. A composite clamping shell for electric cigar lighters, comprising in combination:
(a) a rolled sheet-metal body of tubular configuration, having open ends and a reverse-bend clinched seam extending longitudinally between its ends,
(b) said body having a plurality of inwardly-displaced stop shoulders adjacent one end and spaced circumferentially apart,
(c) said stop shoulders being spaced inwardly from the edge of said one end,
(d) a drawn, sheet metal sleeve of annular configuration, having a rolled screw thread in its wall,
(e) one end of said sleeve having an annular, out-turned flange which is received in the said one end of the sheet-metal body in abutment with said stop shoulders,
(f) the edge portions of said one end of the sheet-metal body being laid over the flange of said threaded sleeve to retain the latter on the body,
(g) one of said stop shoulders comprising an end portion of the reverse-bend clinched seam.

29. The invention as defined in claim 28, wherein:
(a) substantially all parts of said end portion lie within the cylindrical surface formed by the tubular sheet metal body.

30. A composite clamping shell for electric cigar lighters, comprising in combination:
(a) a rolled sheet-metal body of tubular configuration, having open ends and a reverse-bend clinched seam extending longitudinally between its ends,
(b) said body having a plurality of inwardly-displaced stop shoulders adjacent one end and spaced circumferentially apart,
(c) said stop shoulders being spaced inwardly from the edge of said one end,
(d) a drawn, sheet metal sleeve of annular configuration, having a rolled screw thread in its wall,
(e) one end of said sleeve having an annular, out-turned flange which is received in the said one end of the sheet-metal body in abutment with said stop shoulders,
(f) the edge portions of said one end of the sheet-metal body being laid over the flange of said threaded sleeve to retain the latter on the body, and
(g) a spade lug integral with said sheet-metal body,
(h) said spade lug comprising a double thickness of sheet metal, providing two layers of superposed material,
(i) the inner layer being sandwiched between the outer layer and the said annular out-turned flange of the drawn, sheet-metal sleeve and being in intimate engagement therewith, to provide added stiffness to said lug,
(j) said sheet metal body having a recess adjacent the location of said spade lug such that the said inner layer can nest in said recess and be sandwiched between the wall thereof and the out-turned flange of the sheet-metal sleeve.

31. The invention as defined in claim 30, wherein:
(a) said recess is imparted to the body when it is in a substantially flat condition.

32. A composite clamping shell for electric cigar lighters, comprising in combination:
(a) a rolled sheet-metal body of tubular configuration, having open ends and a reverse-bend clinched seam extending longitudinally between its ends,
(b) said body having a plurality of inwardly-displaced stop shoulders adjacent one end and spaced circumferentially apart,
(c) said stop shoulders being spaced inwardly from the edge of said one end,
(d) a drawn, sheet metal sleeve of annular configuration, having a rolled screw thread in its wall,
(e) one end of said sleeve having an annular, out-turned flange which is received in the said one end of the sheet-metal body in abutment with said stop shoulders, (f) the edge portions of said one end of the sheet-metal body being laid over the flange of said threaded sleeve to retain the latter on the body, (g) the laid-over edge portions of the said one end of the sheet-metal body being dimpled in at least one location, so as to more tightly engage the said outturned flange of the drawn, sheet-metal sleeve, thereby preventing relative rotation between said body and said sleeve.

* * * * *